United States Patent [19]
Shoffa

[11] 3,805,201
[45] Apr. 16, 1974

[54] HERMETICALLY SEALED OVERCURRENT RELAY

[76] Inventor: Vadim Nikolaevich Shoffa, ulitsa Tashkentskaya 15/22, kv. 288, Moscow, U.S.S.R.

[22] Filed: Feb. 5, 1973

[21] Appl. No.: 329,577

[30] Foreign Application Priority Data
Mar. 27, 1972 U.S.S.R............................ 1762610

[52] U.S. Cl. .............................................. 335/204
[51] Int. Cl. ......................................... H01h 53/10
[58] Field of Search ........................... 335/204, 207

[56] References Cited
UNITED STATES PATENTS
3,528,045 9/1970 Shoffa................................ 335/204

Primary Examiner—Roy N. Envall, Jr.
Attorney, Agent, or Firm—Eric H. Waters

[57] ABSTRACT

A hermetically sealed overcurrent relay comprising, according to the invention, a central conductor extending therethrough, magnetically operated contacts mounted on contact springs, embracing the central conductor and placed in a glass envelope, as well as two permanent magnets embracing the magnetically operated contacts and mounted movably relative thereto, the like poles of said permanent magnets being disposed on one side of the neutral section plane of the latter.

1 Claim, 5 Drawing Figures

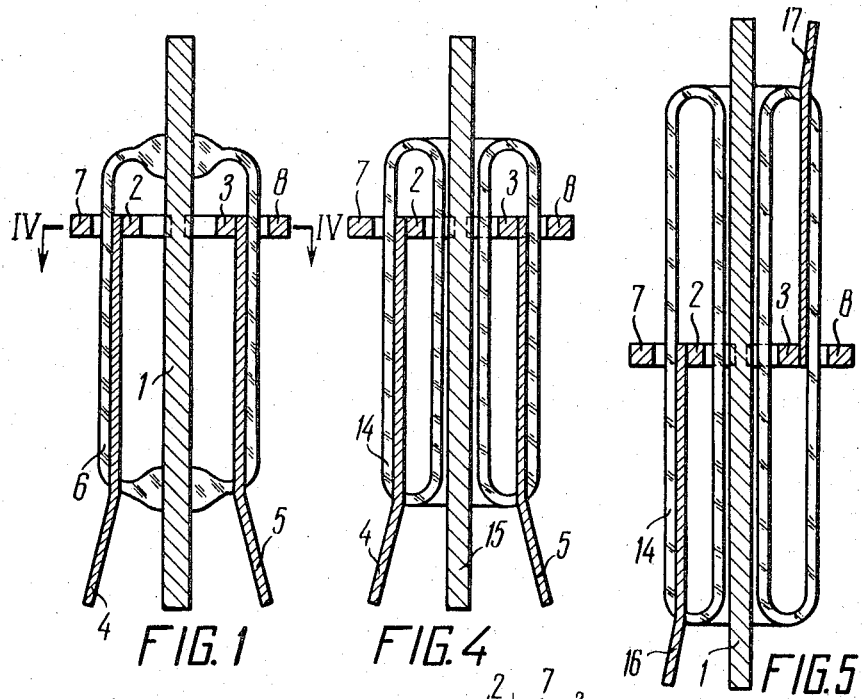
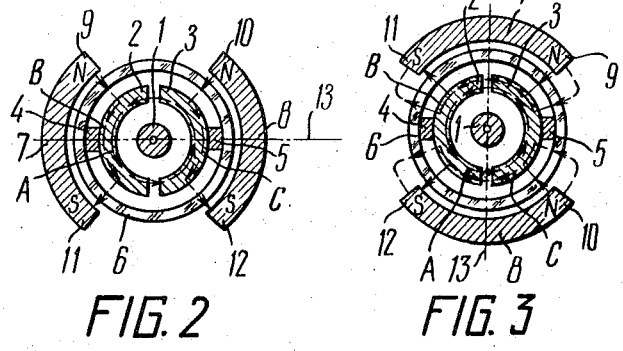

HERMETICALLY SEALED OVERCURRENT RELAY

The present invention relates to relaying equipment, and more particularly to a hermetically sealed overcurrent relay. It can be used in the protection and control circuits of various types of electrical equipment and is most advantageous for use under arduous conditions such as elevated humidity, fluctuating pressures, corrosive fumes and vapors, and explosion hazard.

Known in the art are hermetically sealed overcurrent relays comprising a central conductor and magnetically operated contacts forming two air gaps therebetween. These contacts are mounted on contact springs so as to embrace the central conductor, and are located in a glass envelope. Such relays also comprise two permanent magnets embracing the contacts and being mounted movably with respect thereto, the like poles of the permanent magnets being disposed on either side of the neutral section plane of the latter.

These hermetically sealed overcurrent relays, however, suffer from a disadvantage which lies in that the operate-current setting is effected within an insufficiently wide range because the magnetic fluxes of the permanent magnets in each magnetically operated contact shunt those in the air gaps of said contacts, and, additionally, the magnetic fluxes between the unlike poles of the permanent magnets of such relays are subject to pronounced magnetic dispersion.

Another disadvantage is that the operate-current setting of the relay is effected only so as to tend towards an increase thereof, which corresponds to the instance of infinitely distant permanent magnets. This is accounted for by the following. The operate-current setting tending towards a decrease thereof can be accomplished by adding up the main air-gap flux, set up as a result of a current flow through the central conductor, with the magnetic flux set up by the permanent magnets. In the relays under consideration, the effect produced by adding up the magnetic fluxes in the air gaps with a respective mutual arrangement of the permanent magnets and the magnetically operated contacts, as well as a respective current polarity in the central conductor, is compensated by the shunting action of the magnetic fluxes passing through those portions of the magnetically operated contacts which are between the unlike poles of the permanent magnets.

For the same reason, the prior art relays fail to ensure proper operate-current setting upon reversal of the polarity of the current flowing through the central conductor.

It is an object of the present invention to extend the operate-current setting range of a hermetically sealed over-current relay in the sense of increasing the actuation current values.

Another object of the invention is to provide a relay wherein the operate-current setting will be effected to tend not only towards an increase thereof but also towards its decrease, as with respect to the instance of infinitely distant magnets.

Still another object of the invention is to provide a relay wherein the operate-current setting will not be affected by the polarity reversal of the current flowing through its central conductor.

With these and other objects in view, the essence of the present invention resides in that in a hermetically sealed overcurrent relay comprising a central conductor, magnetically operated contacts mounted on contact springs, embracing the central conductor and placed in a glass envelope, and two permanent magnets embracing the magnetically operated contacts and mounted movably relative thereto, with the permanent magnets being, according to the invention, arranged relative to each other so that their like poles are disposed on one side of their neutral section plane.

Various other objects and advantages of the invention will hereinafter become more fully apparent from the following description of the preferred embodiments thereof taken in conjunction with the accompanying drawings, wherein:

FIG. 1 is a generally schematic view of a hermetically sealed overcurrent relay with a central conductor partially sealed in a glass envelope and contact springs arranged in the same direction, according to the invention;

FIG. 2 is a section taken on line IV—IV through the relay of FIG. 1;

FIG. 3 is a section taken on line IV—IV through the relay of FIG. 1 with its permanent magnets turned clockwise through 90° with respect to the glass envelope;

FIG. 4 is a generally schematic view of a hermetically sealed overcurrent relay with a central conductor passing freely through an orifice in the glass envelope and contact springs arranged in the same direction, according to the invention;

FIG. 5 is a generally schematic view of a hermetically sealed overcurrent relay with a central conductor passing freely through an orifice in the glass envelope and contact springs arranged in opposite directions, according to the invention.

Referring now to the drawings, the hermetically sealed overcurrent relay shown in FIG. 1 comprises a central conductor 1, magnetically operated contacts 2 and 3 shaped as half-rings, embracing the central conductor 1, and mounted on the free ends of contact springs 4 and 5 arranged in the same direction. The magnetically operated contacts 2 and 3 are positioned within a glass envelope 6. The conductor 1 and contact springs 4 and 5 are partially sealed in the glass envelope 6. The contacts 2 and 3 are embraced by two permanent magnets 7 and 8 whose like poles 9, 10 and 11, 12 (FIG. 2) are disposed on one side of the neutral section plane 13 of the permanent magnets 7 and 8.

Shown in FIG. 2 is the relay of FIG. 1 sectioned through line IV—IV. The permanent magnets 7 and 8 have poles 9, 11 and 10, 12, respectively. The like poles 9, 10 and 11, 12 are disposed on one side of the neutral section plane 13 of the magnets 7 and 8. The magnetic flux generated by the current through the central conductor, is designated by A. The magnetic fluxes established by the permanent magnets 7 and 8 are designated as B and C, respectively.

FIG. 3 shows the relay of FIG. 1 sectioned through line IV—IV with the permanent magnets 7 and 8 rotated through 90° with respect to the glass envelope 6.

Shown in FIG. 4 is another embodiment of the hermetically sealed overcurrent relay. This embodiment differs from the one described above in that its glass envelope 14 is made in the form of a toroid, and its central conductor 15 passes freely through an orifice in the glass envelope.

FIG. 5 shows still another embodiment of a hermetically sealed overcurrent relay similar to the relay of FIG. 2, the only difference being that its contact springs 16 and 17 are arranged to extend in opposite directions.

When the magnets 7 and 8 are arranged so that their like poles 9, 10 and 11, 12 are on one side of the neutral section plane 13 of these magnets, their stray fluxes diminish. Consequently, when the air gaps of the magnetically operated contacts 2 and 3 are between the like poles 9, 10 and 11, 12 of the permanent magnets 7 and 8 (FIG. 2), the magnetic fluxes B and C intensify as they pass through the contacts 2 and 3, whereas they do not pass at all through the air gaps. This results in a stronger attraction of the magnetically operated contacts 2 and 3 to the permanent magnets 7 and 8, and, consequently, in an intensification of the operating currents of the relay.

When the air gaps of the magnetically operated contacts 2 and 3 are between the unlike poles 9, 11 and 10, 12 of the permanent magnets 7 and 8 (FIG. 3), the magnetic fluxes B and C of the latter do pass through the air gaps, and in one of these gaps these fluxes are added to the main magnetic flux A, while in the other gap they are subtracted therefrom. Since the electromagnetic attractive force acting upon the magnetically operated contacts 2 and 3 in each air gap is proportional to the square of the resulting air-gap flux, the relay will operate at a lesser current in comparison with the case of infinitely distant magnets. Accordingly, the magnetically operated contacts 2 and 3 close either only in the air gap in which the magnetic fluxes are summed up, or first in the air gap in which the magnetic fluxes are summed up and then in the air gap in which the fluxes are subtracted one from each other. Thus, the adjustment of the operate current is effected to tend towards a decrease thereof.

In the inventive relay, the operating currents can be properly adjusted even when the polarity of the current through the central conductor reverses since the polarity reversal does not affect the summary electromagnetic action upon the magnetically operated contacts 2 and 3. When the air gaps are between the unlike poles 9, 11 and 10, 12 of the permanent magnets 7 and 8, a polarity reversal of the current flowing through the central conductor 1 will cause the magnetically operated contacts 2 and 3 to close only in the other air gap.

The inventive relay operates as follows.

When the central conductor 1 is de-energized, the magnetically operated contacts 2 and 3 are open. As current starts to flow through the conductor 1, the main magnetic flux A passes through the contacts 2 and 3 (FIGS. 2 and 3), whereby the magnetic flux generates electromagnetic forces overcoming the elastic forces of the contact springs 4 and 5, and thereby attracting the magnetically operated contacts 2 and 3 to each other. At a particular value of the current passing through the central conductor 1 (operate value), the contacts 2 and 3 are attracted to each other, thus closing the external electric circuit. As the current diminishes to the release value, the magnetically operated contacts 2 and 3 separate and break open the external electric circuit.

The permanent magnets 7 and 8 establish the magnetic fluxes B and C in the magnetically operated contacts 2 and 3 (FIGS. 2 and 3). As the permanent magnets 7 and 8 approach the contacts 2 and 3 (FIG. 2), the operating current increases, the increase being more significant as compared to the embodiment in which like poles 9, 10 and 11, 12 of the permanent magnets 7 and 8 are disposed on either side of the neutral section plane 13 of the latter magnets. In the embodiment shown in FIG. 3, similar approaches of the permanent magnets 7 and 8 to the magnetically operated contacts 2 and 3 results in a decrease in the operating current of the relay, there being two ways in which the contacts 2 and 3 may close: closure of both pairs of the contact end faces, or closure of only one pair thereof added wherein are the magnetic fluxes set up by the current through the central conductor 1 and by one of the permanent magnets 7 and 8 (referring to FIG. 3, the magnetic flux A set up by the current through the conductor 1 is added with the magnetic flux B established by the permanent magnet 7, whereby the upper pair of the contact end faces is closed).

As can be seen from FIGS. 2 and 3, the operation of the inventive relay remains unaffected by a polarity reversal of the current through the central conductor 1.

In order to reduce the size of the relay and also to extend the range of its operation (to ensure the operate-current setting from values less than that of the operating current in the absence of permanent magnets in the relay, to values exceeding said operate-current value), it is expedient that the setting be effected not by moving the permanent magnets 7 and 8 along a straight line, but by turning them relative to the glass envelope 6 (FIG. 3).

I claim:

1. A hermetically sealed overcurrent relay comprising, in combination, a central conductor extending therethrough, contact springs, magnetically operated contacts mounted on said contact springs so as to embrace said central conductor, a sealing envelope at least partly encompassing said magnetically operated contacts, two permanent magnets for adjusting the relay actuation current of the relay, said magnets having a common neutral section plane and embracing said magnetically operated contacts and mounted movably relative thereto, said magnets being so arranged relative to each other that their like poles are disposed on one side of the neutral section plane of said magnets.

* * * * *